United States Patent Office 3,574,032
Patented Apr. 6, 1971

3,574,032
CONTACT BODY FOR WATER AND AIR AS EMPLOYED IN COOLING TOWERS
Per Gunnar Norback, 33 Askrikevagen, Lidingo 1, Sweden, and George W. Meek, 1205 6th St., Page Park, Fort Myers, Fla. 33901
Filed July 15, 1966, Ser. No. 565,483
Claims priority, application Sweden, Jan. 26, 1966, 1,040/66
Int. Cl. B31f *1/20;* B32b *3/02, 7/14*
U.S. Cl. 156—291                                   3 Claims

ABSTRACT OF THE DISCLOSURE

This disclosure provides a method of preparing corrugated, non-metallic layer elements for use in the production of a contact body for gas and liquid. An adhesive material having adhesive characteristics effective to be re-activated by change in surrounding atmospheric conditions is used in the method of this invention. The adhesive material is applied to at least a portion of the corrugations at a plurality of points of contact for adjacent layer elements to be used in a contact body for gas and liquid. The adhesive material is subsequently dried to a solid, non-adhesive condition to form an intermediate article of manufacture. This intermediate article of manufacture may be subsequently stored or assembled in the field to form a contact body for gas and liquid. Once the intermediate articles have been stacked appropriately with respect to each other, the adhesive material is reactivated to cause the adjacent sheet elements to adhere thereto. Subsequent resolidification of the adhesive material effects the production of the desired contact body.

BACKGROUND OF THE INVENTION

The present invention relates to a method for manufacturing a water and air contact body, such as is employed in cooling towers, said body being composed of thin non-metallic layers, preferably of fibrous material, which abut each other at mutually spaced positions and between these positions form through-going channels for the media meeting in the body. All of the layers may be corrugated, in which case the corrugations intersect each other at adjacent layers in the finished contact body, or they may form honey-comb patterns. According to another embodiment the layers may be alternatingly flat and corrugated, or the layers may be provided with protrusions in the form of lugs.

The layer takes up a small fraction of the volume of the contact body, which is particularly advantageous when the mean distance between the layers is relatively great, such as 10 mm. or more. The contact bodies, when being transported or stored, require a considerable amount of space as compared to the volume of the solid material in the body. Because of this the contact bodies are easily damaged since the thin layers have very little strength to protect them against mechanical damage during transport.

It is therefore an object of the invention to eliminate these disadvantages, which according to a characterizing feature of the invention, is substantially achieved in that layers of starting material are folded or are provided with protrusions or the like, in a uniform manner or in accordance with a substantially uniform pattern, and are coated at the intended points of contact or at the tops respectively with an adhesive of such a type that after being applied in solid state can later be caused to carry out its function as a glue, and that the layers are stored and dispatched in a compact form with the folds or protrusions accommodating one another, to be later combined to form a contact body while reactivating the adhesive.

The layers provided with corrugations, lugs or the like, occupy a space when stacked one on top of the other, which is only a small fraction of the volume of the finished body. At the same time compact layer packs can be inexpensively packed so that they are effectively protected against damage during transport. It is, as a rule, difficult to adopt more complicated means of conbining the layers to a composite contact body, and consequently according to a specific feature of the present invention the layers are delivered with the requisite adhesive applied in a manner which permits the layers to be positively joined by means of a simple procedure and without the use of skilled labor. The adhesive agent can be re-activated by means of a simple heating devicse, providing that the adhesive is thermoplastic.

The invention will be more specifically described hereafter with reference to embodiments shown illustratively on the accompanying drawings, whereby other features characteristic to the invention will be also disclosed.

Figure 1:
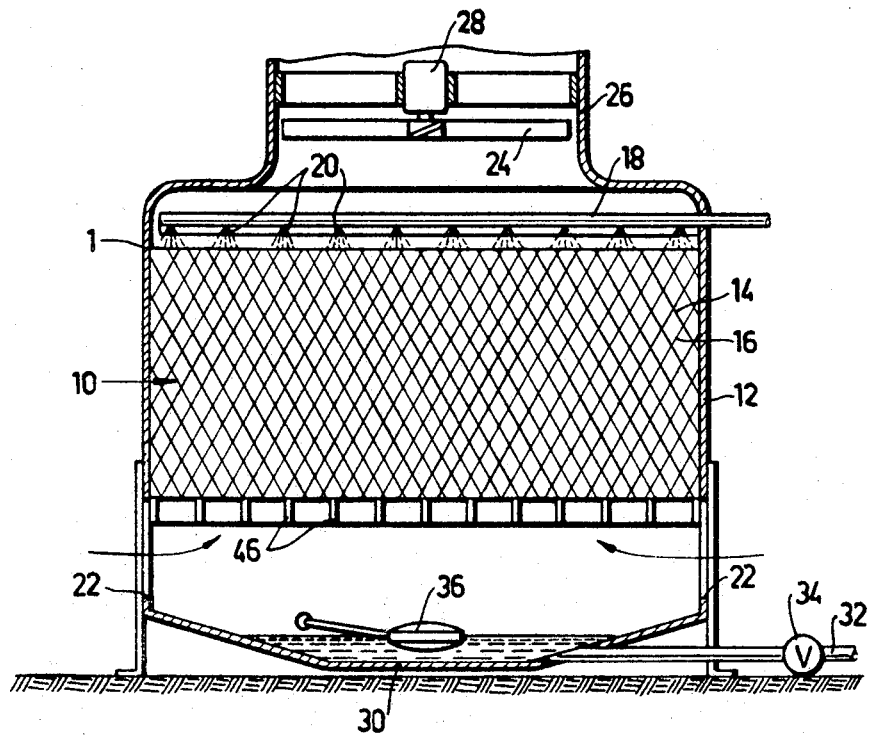
FIG. 1 is a vertical longitudinal sectional view through a cooling tower operating according to the counter-flow principle and provided with a contact body constructed according to the invention.
Figure 2:
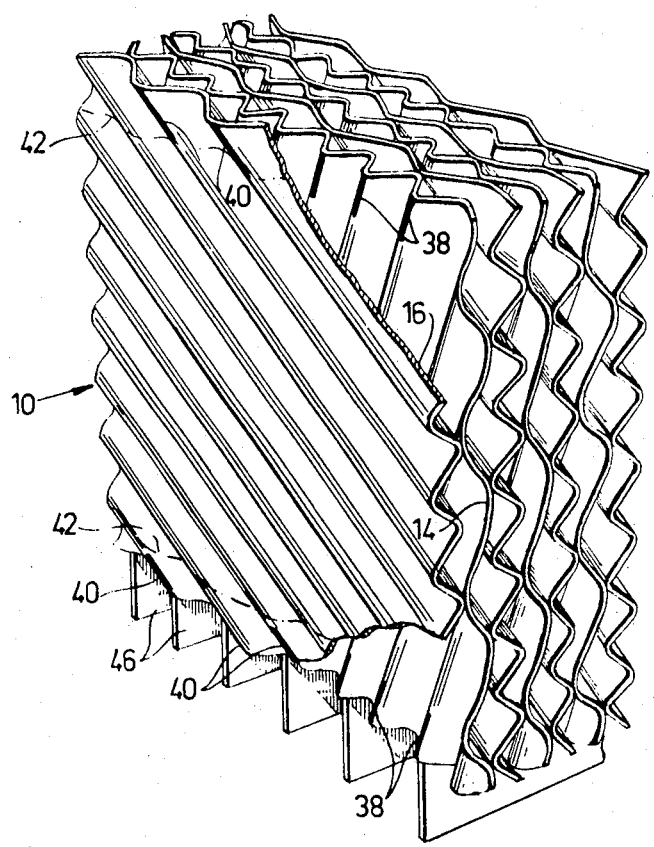
FIG. 2 is a perspective view of a portion of the contact body.

In FIG. 1, 10 indicates a contact body suitably composed of several units, and which is enclosed in a casing 12 and which two media, such as water and air, passes in counter current. The contact body 10 and its separate units respectively comprise thin layers or sheets 14, 16, all of which are undulated or corrugated but have the corrugations in each layer crossing those in the adjacent layer, whereby vertical as well as horizontal through-going channels, grooves or passages are obtained throughout the entire contact body. These channels or grooves furthermore, have constantly varying widths from zero at the point of contact between the layers to a height of twice the height of the corrugations. This height can extend to from 5–20 mm. and should suitably be 10–15 mm. The layers have a thickness of some few tenths of a millimeter and are manufactured of a fibrous material, preferably one that is fire-resistant or inflammable, such as asbestos paper. Layers manufactured from such material have a very low wet strength and hence such material is impregnated with a curable or thermoplastic resin such as phenol resin or melamine resin, the amount of this substance being regulated so that the fibrous material still retains good film-forming or wetting properties. The amount of resin in the layer can reach 10–13 percent by weight.

By impregnating thin asbestos layers in this manner, the layers, in addition to obtaining the required wet strength, also obtain an improved mechanical strength.

Water is supplied to the cooling tower through a conduit or a network of conduits 18 which are provided at the bottom with outlet openings 20. Arrangements for continuously or intermittently supplying and spraying water over the surfaces of the contact body 10 can be of a known type and therefore are not described in detail herein. Air enters from the bottom through side openings 22 in the lower portion of the casing 12 and is caused to flow through the channels in the contact body by means of a fan 24 which is located in an outlet 26 in the upper portion of the casing 12 and which is driven by a motor 28. The bottom of the cooling tower is designed as a water sump 30 from which the cooled water is led to the place of usage by means of a conduit 32 in which a valve 34 is located. The level of water in the sump 30 is controlled by means of a float mechanism 36 so that fresh water is added to replace water losses through evaporation in the contact body. The water is led away from the place of usage back to the conduit 18 for renewed cooling.

The corrugations or undulations of the layers 14, 16 intersect at an angle which is less than 90 degrees, preferably within the range 35–75 degrees, such as about 60 degrees. Thus, the angle at which the corrugation is inclined to vertical is half these values.

Figure 3:
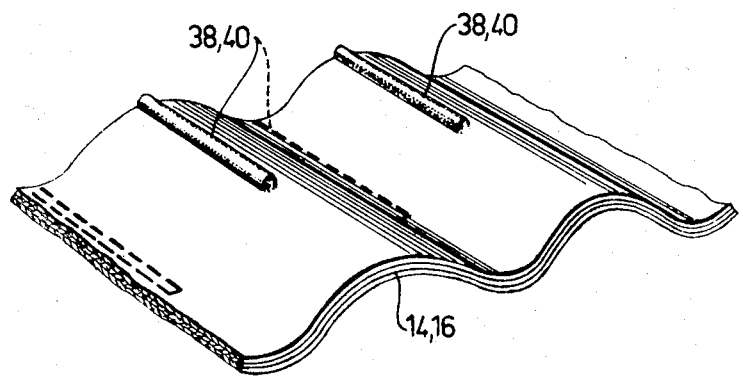
FIGS. 3 and 4 show portions of piles of layers which are stacked together for storage or transport.
Figure 4:
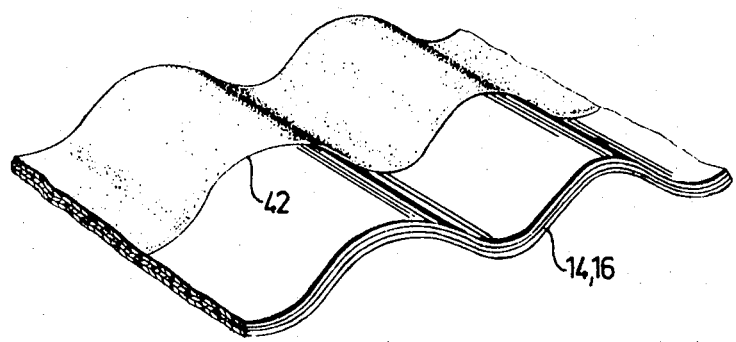

In the embodiments disclosed, the layers 14, 16 have the same pattern and on assembling the contact body need only be rotated through 180 degrees around a center axis parallel with either of the edges of the layers. This means that they can also be piled on top of each other with the corrugations fitting into or accommodating each other in the way clearly seen in FIGS. 3 and 4.

When the layers have been corrugated they are provided with glue beads 38, 40 along two or more edges along the tops of the ridges of the corrugations which come into contact with each other when the contact body is complete. These glue beads are preferably applied along the two opposing edges of the layers which in the completed body 10 form the upper and lower side of the same. The beads have such a length that they positively reach the contact point where two intersecting corrugations contact with each other. The distance of the outermost contact from the edge of the layer can thus vary by a distance approximately corresponding to the division between two ridges. It is only necessary to apply the glue beads on one side of each layer. However, it is advantageous that both contacting ridges are provided with a glue bead, since the adhesive may otherwise be rubbed off by the untreated ridge, that is when the layers are of impregnated asbestos. Thus, with a double coating, a large primary contact area between the adhesive and each layer is obtained at their common glue lines. The glue beads may be of such length that two or several contact points along each ridge form glue lines. However, the length of the bead should be kept at a minimum so that the flow cycle is not unnecessarily disturbed during the functioning of the contact body, particularly on the water side.

The folded layers are provided, according to the invention, with glue beads of such type that the layers, subsequently to being dried, can be stacked in close contact with each other. The adhesive can be later caused to act as a securing agent when the contact bodies are assembled, for example, by heat treatment. So-called Plasticol, comprising PVC powder slurried in a solvent or softener, is an example of this type of adhesive. The adhesive is applied as an emulsion in the form of beads 38, 40 and dried at 80–120 degrees when the softener becomes absorbed in the PVC powder. After being cooled, the glue beads are solid and in no way tacky.

As a result, the produced layers can be stacked together to form a package of suitable thickness for storage or transport. The contact bodies can be assembled at the site of use by rotating the layers alternately through 180 degrees as heretofore stated, so that the layers are caused to abut each other and between them define through-going channels of constantly varying width. The edges of the layers can then be heated by means of a heating apparatus until the plastic beads obtain a temperature of 170–200 degrees C., said plastic beads then melting and forming a homogeneous melt which, after solidifying, adheres in an effective manner. This assembly operation can be carried out by personnel with no particular skill in the field.

Preferably the glue beads 38, 40 are of significant thickness, such as 0.5–1 mm. high or more, to insure that a good bonding action between all of the layers is obtained, even though the layers are warped or for some other reason distorted to cause them to deviate from the geometric shape; something that is difficult to avoid in practice. Consequently, although gaps may appear at the edges between separate pairs of layers, a positive bonding effect at the contact points of the glue beads is nevertheless secured. From this it can be seen that it is of special importance that the beads be kept short so that they do not obstruct the water that is passed over the main portion of the layer surfaces of the contact body.

The mechanical strength of the layer or sheet, which is only some few tenths of a millimeter thick, can be improved, with respect to transporting difficulties as well as in respect to the finished contact body, by applying a plastic or resin as a continuous bead 42 along the edge. This continuous bead can, although not a condition, be formed of the same substance as that used to glue the layers together. It is particularly suitable to apply the strengthening bead 42 to the upper and lower sides of the contact body, since it is these portions which are first subjected to the strong jets of water and which serve, in other cases, to take the weight of the contact body when it rests on the support 46 or the like. The bead coating 42 preferably consists of a material which is fire-resistant. In other respects the strengthening beads 42 enable the main portion of the layer to be substantially designed with a view to giving the best effect possible in the cooling tower, such as good water absorption properties or the least possible disturbance to the flow of water over the surface of the layers, whereas the main object of the beads is to increase the mechanical resistance to damage and also to assist the corrugations in retaining their shape.

Figure 5:
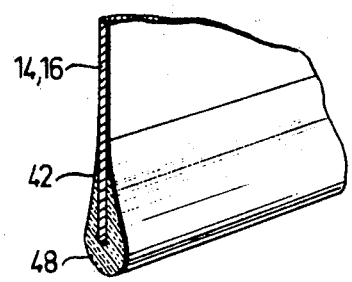
FIG. 5 shows a cut-away view of a portion of the edge of a layer in a larger scale.

By forming the bead 42 by immersing the layer in a bath and allowing said bead to solidify in a vertical position, the bead can be given an additional strengthening edge-bulge 48 (FIG. 5). This bulging is formed by the capillary action which occurs along the edge when the fluid runs away from said edge as the bead solidifies.

The strengthening bead 42 also prevents portions of the layer, particularly if they are relatively brittle, from breaking away and being carried off by the flow of water, and thus prevents such portions from blocking or throttling the flow paths in the cooling tower. The strengthening bead 42 can be made of a plastic which is softer or tougher than the layer, providing the layers are made of asbestos paper impregnated with melamine, so that the edges of said layers hold together even though the bead should be broken.

It is particularly advantageous to apply the glue beads to the edges (the horizontal and possibly the vertical edges) because they are easily accessible for the purpose of re-activation of the adhesive substance at the usage site. However, it is also conceivable to apply glue beads at one or more points over the inner portions of the layer, in the event that the edge joints do not give sufficient strength to the contact body.

Figure 6:
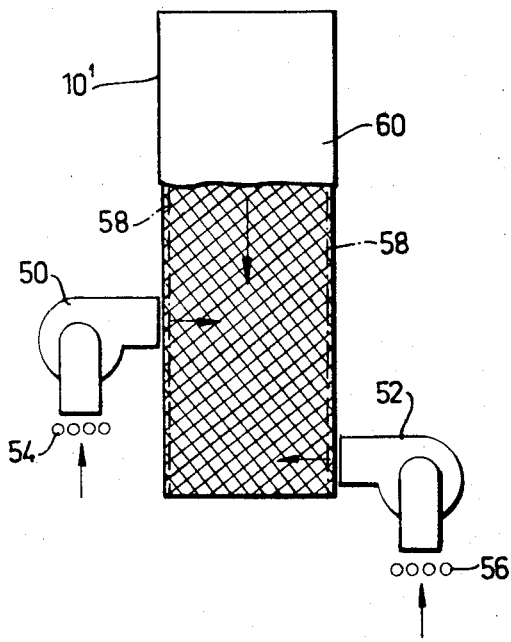
FIGS. 6 and 7 show diagrammatically two devices for joining the layers together.

FIG. 6 shows a device for assembling the layers at the site of usage, said device including two fans 50, 52 at the suction sides of which are arranged heaters 54 and 56. The layers 14, 16 as shown in FIGS. 1 and 5 are laid freely on a support, such as a carriage, and on top of one another with the corrugations crossing each other. The stack of layers so produced and shown at 10' is given a height corresponding to the required thickness of the contact body. The outlet nozles of the fans 50, 52 are brought closely adjacent to the long sides of the stack of layers 10', where the ridges of the corrugations have ben previously coated with a thermoplastic adhesive agent. A continuous glue bead, according to the above, can also be applied along the edges of the layers. The edge portion provided with adhesive is indicated with the dash dot lines 58. A small pressure can be exerted by a plate 60 placed on top of the pile of layers, to cause a more positive contact between the layers or sheets 14, 16. When the stack 10' is moved past the fans 50, 52 the heated air or gas flowing from the fans passes between the layers and causes the edges to be heated sufficiently to allow the glue to adherently attach the layers together. The outlet openings of the fans can have a height corresponding to the height of the stack 10' or the re-activation of the adhesive can be effected in zones, the height of the fans thus being successively changed as the stack is passed back and forth between the fans.

Figure 7:
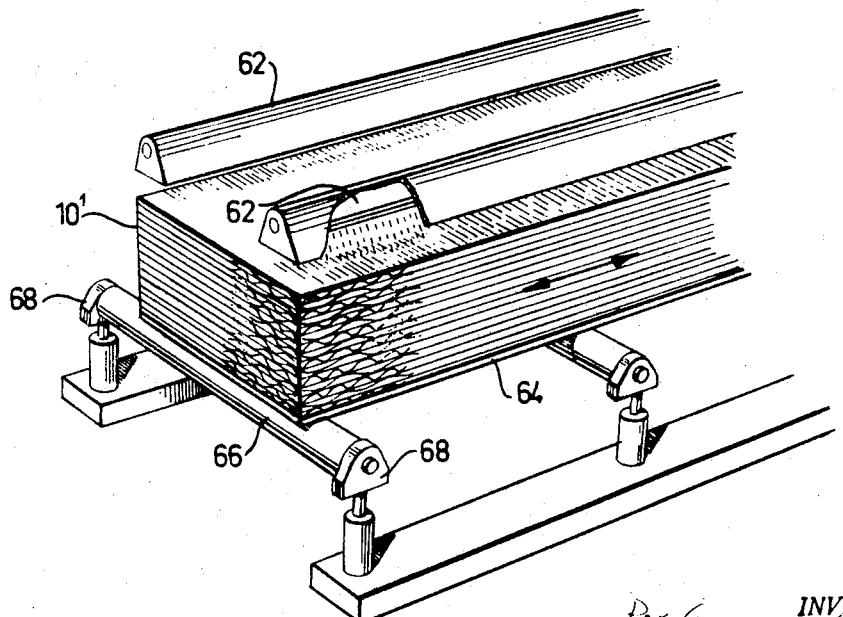

In the embodiment according to FIG. 7, the necesary heating of the layers is caused by means of elongated heat-radiating lamps 62 which are located above the stack of layers 10'. The layers are placed on a plate 64 which rests on rollers 66 and the bearing devices 68 of said rollers can be adjusted vertically. The plate 64 is moved on the rollers 66 backwards or forwardly under the lamps 62 while the stack 10' of layers grows in height. Each layer is thus subjected to the action of the lamps, the position of which, relatively to the uppermost layer can be adjusted by the lowering of the rollers 66 in stages corresponding to the division between the layers.

The invention is not restricted to the shown embodiment, but can be varied in a plurality of ways within the scope of the inventive concept. The invention can be adapted in such cases where air is dried by means of an aqueous solution containing an absorbing salt such as calcium chloride or lithium chloride. Although this description relates to water and air, other liquids and gases are included in this definition where similar conditions exist. The contact bodies can be used for heating water by means of hot air, steam air mixing or hot combustion gases.

In certain cases the layers can be composed of plastic which is porous, that is provided with fine pores. A solvent can be used to re-activate the adhesive or to bind the plastic layers together. It is important that the correct shape of the layers be not jeopardized.

The strengthening bead or zone 42 need not necessarily be continuous in the longitudinal direction of the edge but can be divided up into strips or the like, which however must intersect the corrugation at right or oblique angles if the layers are to be stacked together. The strengthening beads can be produced by means of glued-on strips which can be coated with an adhesive substance on both faces.

In a case where the layer has been provided with a strengthening bead 42 along at least two of its four edges it is conceivable to assemble them in the cooling tower, particularly with respect to small sizes, without mutually gluing the same together.

The invention can be adopted to advantage in cooling towers which operate in accordance with the cross flow principle. In a cooling tower of this type the air has a substantially horizontal direction of flow through the channels between the layers, while the water flows from the top downwardly. In such cases the glue beads 38, 40 can be applied to the vertical edge portions of the contact bodies at which the air enters or departs from said contact body. The strengthening beads 42 can also be arranged at the top and at the bottom and also at the outwardly exposed vertical side edges of the contact body. In this case the corrugations of the layer may have varying angles of slope in each alternate layer. It can be understood from this that the layers are divided into two groups when they are placed within each other to form a compact package for transport.

What is claimed is:
1. A method of preparing a corrugated, non-metallic layer element for use in the production of a contact body for gas and liquid comprising the steps of:
  (a) immersing an edge portion of the element in a bath of liquid plastic material for a time sufficient to form a strengthening edge bulge along at least one edge thereof,
  (b) said edge bulge constituting a reinforced portion to effect a greater mechanical strength than the material forming an inner portion of the layer element,
  (c) stacking said reinforced elements after drying for storing or shipment prior to subsequent assembly into said contact body .
2. A method of producing a contact body for gas and liquid comprising the steps of:
  (a) providing a plurality of layer sheet elements having corrugations extending from one side of the elements to another side thereof,
  (b) forming a strengthening edge bulge along an edge of at least a portion of the elements,
  (c) applying an adhesive material on at least a portion of the corrugations at a plurality of the points of contact for adjacent layer elements at locations along the top thereof, and
  (d) placing the plurality of the layer sheet elements in juxtaposed relationship so that the corrugations on alternate sheet elements cross the corrugations on intervening sheets and extend obliquely with respect to the edge bulge, said points of contact carrying the adhesive material being contiguous.
3. The method as defined in claim 2 wherein said bulge forming step includes immersing an edge portion of the elements in a bath of liquid plastic material for a time sufficient to form a strengthening edge bulge along at least one edge thereof.

References Cited

UNITED STATES PATENTS

| | | | |
|---|---|---|---|
| 2,341,398 | 2/1944 | Strother et al. | 156—332X |
| 3,155,153 | 11/1964 | Axelsson | 165—8 |
| 2,099,598 | 11/1937 | Carter | 161—137X |
| 2,209,311 | 7/1940 | Karcher | 156—291X |
| 2,523,022 | 9/1950 | Horstman. | |
| 2,793,017 | 5/1957 | Lake | 261—112 |
| 3,262,682 | 7/1966 | Bredberg | 261—112X |
| 3,281,307 | 10/1966 | Moeller et al. | 261—112X |

HAROLD ANSHER, Primary Examiner

M. E. McCAMISH, Assistant Examiner

U.S. Cl. X.R.

156—210; 161—127, 135, 136, 137